US011449816B2

(12) United States Patent
Geisler et al.

(10) Patent No.: US 11,449,816 B2
(45) Date of Patent: Sep. 20, 2022

(54) SYSTEM AND METHOD FOR WORKFLOW MANAGEMENT

(71) Applicant: Hand Held Products, Inc., Charlotte, NC (US)

(72) Inventors: James Geisler, Pittsburgh, PA (US); Steven Thomas, Murrysville, PA (US); John Pecorari, Harrison City, PA (US); Adam Jack Hertzman, Pittsburgh, PA (US); Duff Halart Gold, Apollo, PA (US); Jared John Schmidt, Pittsburgh, PA (US); Brian Matthew Connelly, Verona, PA (US); Christopher Lofty, Canonsburg, PA (US); Surya K. Tanneru, Pittsburgh, PA (US); Navaneetha Myaka, Pittsburgh, PA (US); Kurt Charles Miller, Trafford, PA (US); Duane Littleton, Olmsted, OH (US); Brent Alan Nichols, Fort Mill, SC (US); Michael Naughton, Oakmont, PA (US); Keith Braho, Murrysville, PA (US); Tonya L. Custis, Minneapolis, MN (US); Kwong Wing Au, Bloomington, MN (US); Ronald Shane Fazzio, Eden Prairie, MN (US); Arup Suprakash Mukherjee, Monroeville, PA (US); Justin Allan Volz, Verona, PA (US); Kartik Suchindra Babu, Pittsburgh, PA (US)

(73) Assignee: HAND HELD PRODUCTS, INC., Charlotte, NC (US)

(*) Notice: Subject to any disclaimer, the term of this patent is extended or adjusted under 35 U.S.C. 154(b) by 0 days.

(21) Appl. No.: 17/019,583

(22) Filed: Sep. 14, 2020

(65) Prior Publication Data
US 2020/0410414 A1 Dec. 31, 2020

Related U.S. Application Data

(63) Continuation of application No. 14/861,270, filed on Sep. 22, 2015, now Pat. No. 10,810,530.
(Continued)

(51) Int. Cl.
*G06Q 10/06* (2012.01)
*G06Q 10/08* (2012.01)
*G06F 3/16* (2006.01)

(52) U.S. Cl.
CPC ......... *G06Q 10/0633* (2013.01); *G06F 3/167* (2013.01); *G06Q 10/08* (2013.01)

(58) Field of Classification Search
None
See application file for complete search history.

(56) References Cited

U.S. PATENT DOCUMENTS 6,744,436 B1  6/2004 Chirieleison et al.
6,832,725 B2  12/2004 Gardiner et al.
(Continued)

FOREIGN PATENT DOCUMENTS

CN  206437831 U  *  8/2017
WO  2013/163789 A1  11/2013
(Continued)

OTHER PUBLICATIONS

Sunol "Warehouse operations: Optimizing the Putaway Process" (2020) (https://articles.cyzerg.com/putaway-process-optimization-warehouse-operations) (Year: 2020).*
(Continued)

Primary Examiner — Sujay Koneru
(74) Attorney, Agent, or Firm — Alston & Bird LLP

(57) ABSTRACT

A workflow management system for managing the storage, retrieval, and transport of items in a warehouse includes a voice-directed mobile terminal. The system also includes a
(Continued)

server computer in communication with the voice-directed mobile terminal. The server computer includes a tasking module for transmitting task data to the voice-directed mobile terminal. The server computer also includes a workflow-analysis module for generating, based at least in part upon an analysis of workflow dialog between the voice-directed mobile terminal and the user, performance data relating to the performance of tasks associated with the storage, retrieval, and/or transport of the items.

20 Claims, 2 Drawing Sheets

Related U.S. Application Data

(60) Provisional application No. 62/056,327, filed on Sep. 26, 2014.

(56) References Cited

U.S. PATENT DOCUMENTS

| | | |
|---|---|---|
| 7,128,266 B2 | 10/2006 | Zhu et al. |
| 7,159,783 B2 | 1/2007 | Walczyk et al. |
| 7,295,990 B1* | 11/2007 | Braumoeller ........ G06Q 10/063 705/7.31 |
| 7,413,127 B2 | 8/2008 | Ehrhart et al. |
| 7,685,026 B1 | 3/2010 | McGrady et al. |
| 7,726,575 B2 | 6/2010 | Wang et al. |
| 7,774,243 B1* | 8/2010 | Antony ................ G06Q 10/087 705/28 |
| 8,024,064 B1* | 9/2011 | Sanghavi ............. G06Q 10/087 700/226 |
| 8,086,344 B1* | 12/2011 | Mishra ................ G06Q 30/0283 700/216 |
| 8,294,969 B2 | 10/2012 | Plesko |
| 8,311,906 B1* | 11/2012 | Campbell ................ G07C 3/08 705/28 |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,532,282 B2 | 9/2013 | Bracey |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,655,742 B2* | 2/2014 | Cheng .................. G06Q 10/087 705/26.2 |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,700,443 B1* | 4/2014 | Murray ............ G06Q 10/06315 705/7.31 |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,909 B2 | 5/2014 | Sato et al. |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |

(56) References Cited

U.S. PATENT DOCUMENTS

| | | |
|---|---|---|
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| 9,020,631 B1 * | 4/2015 | Bellavance ............ G06Q 50/28 700/216 |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey et al. |
| 9,342,827 B2 | 5/2016 | Smith |
| 9,355,294 B2 | 5/2016 | Smith et al. |
| 9,367,722 B2 | 6/2016 | Xian et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,407,840 B2 | 8/2016 | Wang |
| 9,412,242 B2 | 8/2016 | Van Horn et al. |
| 9,418,252 B2 | 8/2016 | Nahill et al. |
| D766,244 S | 9/2016 | Zhou et al. |
| 9,443,123 B2 | 9/2016 | Hejl |
| 9,443,222 B2 | 9/2016 | Singel et al. |
| 9,448,610 B2 | 9/2016 | Davis et al. |
| 9,478,113 B2 | 10/2016 | Xie et al. |
| 9,507,974 B1 | 11/2016 | Todeschini |
| D777,166 S | 1/2017 | Bidwell et al. |
| 9,557,166 B2 | 1/2017 | Thuries et al. |
| 9,582,696 B2 | 2/2017 | Barber et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| 9,659,183 B2 | 5/2017 | Yin et al. |
| 9,665,757 B2 | 5/2017 | Feng et al. |
| D790,505 S | 6/2017 | Vargo et al. |
| D790,546 S | 6/2017 | Zhou et al. |
| D790,553 S | 6/2017 | Fitch et al. |
| 9,715,614 B2 | 7/2017 | Todeschini et al. |
| 9,734,493 B2 | 8/2017 | Gomez et al. |
| 9,752,864 B2 | 9/2017 | Laffargue et al. |
| 9,762,793 B2 | 9/2017 | Ackley et al. |
| 9,767,581 B2 | 9/2017 | Todeschini |

(56) References Cited

U.S. PATENT DOCUMENTS

| | | |
|---|---|---|
| 9,786,101 B2 | 10/2017 | Ackley |
| 9,794,392 B2 | 10/2017 | Hejl |
| 9,823,059 B2 | 11/2017 | Li et al. |
| 9,852,102 B2 | 12/2017 | Kohtz et al. |
| 9,857,167 B2 | 1/2018 | Jovanovski et al. |
| 9,861,182 B2 | 1/2018 | Oberpriller et al. |
| 9,864,962 B1* | 1/2018 | Lehmann ......... G06Q 10/06311 |
| 9,891,612 B2 | 2/2018 | Charpentier et al. |
| 9,892,876 B2 | 2/2018 | Bandringa |
| 9,897,434 B2 | 2/2018 | Ackley et al. |
| 9,924,006 B2 | 3/2018 | Schoon et al. |
| 9,930,050 B2 | 3/2018 | Yeakley et al. |
| 9,954,871 B2 | 4/2018 | Hussey et al. |
| 9,978,088 B2 | 5/2018 | Pape |
| 9,984,685 B2 | 5/2018 | Braho et al. |
| 10,007,112 B2 | 6/2018 | Fitch et al. |
| 10,019,334 B2 | 7/2018 | Caballero et al. |
| 10,021,043 B2 | 7/2018 | Sevier |
| 10,038,716 B2 | 7/2018 | Todeschini et al. |
| 10,060,729 B2 | 8/2018 | Laffargue et al. |
| 10,066,982 B2 | 9/2018 | Ackley et al. |
| 10,121,466 B2 | 11/2018 | Pecorari |
| 10,139,495 B2 | 11/2018 | Payne |
| 10,269,342 B2 | 4/2019 | Braho et al. |
| 10,327,158 B2 | 6/2019 | Wang et al. |
| 10,360,728 B2 | 7/2019 | Venkatesha et al. |
| 10,401,436 B2 | 9/2019 | Young et al. |
| 10,410,029 B2 | 9/2019 | Powilleit |
| 10,810,529 B2 | 10/2020 | Miller et al. |
| 10,810,530 B2 | 10/2020 | Geisler et al. |
| 2001/0047293 A1* | 11/2001 | Waller ................. G06Q 20/203 705/22 |
| 2002/0129139 A1 | 9/2002 | Ramesh |
| 2002/0174038 A1* | 11/2002 | Chien ................. G06Q 10/087 705/28 |
| 2004/0138781 A1 | 7/2004 | Sacks et al. |
| 2004/0181467 A1* | 9/2004 | Raiyani ............... G06Q 10/087 705/28 |
| 2004/0193502 A1* | 9/2004 | Heitner ............... G06Q 10/087 705/26.1 |
| 2004/0217162 A1* | 11/2004 | Chigira ............... G06Q 10/08 235/379 |
| 2004/0225579 A1* | 11/2004 | Peery ................. G06Q 10/087 705/28 |
| 2005/0030158 A1 | 2/2005 | Schulmerich et al. |
| 2005/0071158 A1 | 3/2005 | Byford |
| 2005/0278062 A1* | 12/2005 | Janert ................. G06Q 10/08 700/214 |
| 2006/0069629 A1* | 3/2006 | Schweitzer .......... G06Q 10/087 705/28 |
| 2006/0178882 A1 | 8/2006 | Braho et al. |
| 2006/0182085 A1 | 8/2006 | Sweeney et al. |
| 2007/0016460 A1 | 1/2007 | Weiss |
| 2007/0063048 A1 | 3/2007 | Havens et al. |
| 2007/0080930 A1* | 4/2007 | Logan .................... G06Q 10/06 345/156 |
| 2007/0130197 A1 | 6/2007 | Richardson et al. |
| 2007/0156372 A1* | 7/2007 | Christ ................. G06Q 10/087 702/158 |
| 2007/0184881 A1 | 8/2007 | Wahl et al. |
| 2008/0140597 A1* | 6/2008 | Satir ..................... G06Q 10/04 706/46 |
| 2008/0147306 A1* | 6/2008 | Hayashi ............... G05D 1/0289 701/117 |
| 2008/0185432 A1 | 8/2008 | Caballero et al. |
| 2008/0243646 A1* | 10/2008 | Stein ................... G06Q 10/087 705/28 |
| 2008/0294484 A1* | 11/2008 | Furman ............. G06Q 10/06316 705/7.26 |
| 2009/0006164 A1 | 1/2009 | Kaiser et al. |
| 2009/0089145 A1* | 4/2009 | Kent ................... G06Q 50/28 705/7.12 |
| 2009/0125350 A1* | 5/2009 | Lessing ............. G06Q 10/0631 705/7.12 |
| 2009/0134221 A1 | 5/2009 | Zhu et al. |
| 2009/0228313 A1* | 9/2009 | Ding ................. G06Q 10/04 703/6 |
| 2009/0259509 A1* | 10/2009 | Landvater ........ G06Q 10/06315 705/7.31 |
| 2009/0276253 A1* | 11/2009 | Alspaugh ........... G06Q 10/087 705/28 |
| 2010/0036667 A1 | 2/2010 | Byford et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0235168 A1 | 9/2010 | Murawski et al. |
| 2010/0265880 A1 | 10/2010 | Rautiola et al. |
| 2010/0271655 A1* | 10/2010 | Reitz ..................... G06F 3/1235 358/1.15 |
| 2010/0316470 A1* | 12/2010 | Lert ..................... B65G 1/1378 414/273 |
| 2011/0027053 A1* | 2/2011 | Freudelsperger .... B65G 1/1371 414/273 |
| 2011/0035247 A1* | 2/2011 | Perry ................. G06Q 10/087 705/7.38 |
| 2011/0058926 A1* | 3/2011 | Winkler ............. B65G 1/1375 414/795.4 |
| 2011/0112938 A1* | 5/2011 | Inoue ................. G06Q 30/0202 705/28 |
| 2011/0169999 A1 | 7/2011 | Grunow et al. |
| 2011/0191058 A1* | 8/2011 | Nielsen ................. G01V 3/38 702/130 |
| 2011/0202554 A1 | 8/2011 | Powilleit et al. |
| 2011/0237287 A1 | 9/2011 | Klein et al. |
| 2011/0289184 A1* | 11/2011 | Wolinsky ........... G06Q 30/0248 709/217 |
| 2012/0111946 A1 | 5/2012 | Golant |
| 2012/0168511 A1 | 7/2012 | Kotlarsky et al. |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2012/0290495 A1* | 11/2012 | Narasimhamurthy ....................... G06Q 30/0207 705/330 |
| 2012/0303646 A1 | 11/2012 | Maloy et al. |
| 2013/0030955 A1* | 1/2013 | David .................. B25B 11/00 705/26.8 |
| 2013/0043312 A1 | 2/2013 | Van Horn |
| 2013/0075168 A1 | 3/2013 | Amundsen et al. |
| 2013/0082104 A1 | 4/2013 | Kearney et al. |
| 2013/0096735 A1* | 4/2013 | Byford ................. G05D 1/0234 701/2 |
| 2013/0175341 A1 | 7/2013 | Kearney et al. |
| 2013/0175343 A1 | 7/2013 | Good |
| 2013/0204619 A1 | 8/2013 | Berman et al. |
| 2013/0226649 A1* | 8/2013 | Grissom ............. G06Q 10/087 705/7.25 |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0290056 A1* | 10/2013 | Cooper ............. G06Q 10/1093 705/7.18 |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0312371 A1 | 11/2013 | Ambrose |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |

(56) References Cited

U.S. PATENT DOCUMENTS

| | | |
|---|---|---|
| 2014/0002828 A1 | 1/2014 | Laffargue et al. |
| 2014/0008439 A1 | 1/2014 | Wang |
| 2014/0012539 A1* | 1/2014 | Takaoka ............... H04W 4/027 702/160 |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0058801 A1 | 2/2014 | Deodhar et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0083058 A1 | 3/2014 | Issing et al. |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Long et al. |
| 2014/0121445 A1 | 5/2014 | Fontenot et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0156410 A1* | 6/2014 | Wuersch ............... G06Q 30/0261 705/14.58 |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0200946 A1* | 7/2014 | Humphries ............... G06Q 10/087 705/7.25 |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0222321 A1* | 8/2014 | Petty ............... G01C 21/3492 701/117 |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278032 A1* | 9/2014 | Scofield ............... G08G 1/0133 701/118 |
| 2014/0278387 A1 | 9/2014 | Digregorio |
| 2014/0278391 A1 | 9/2014 | Braho et al. |
| 2014/0278823 A1* | 9/2014 | de Oliveira ............... G07C 5/08 705/7.38 |
| 2014/0278828 A1* | 9/2014 | Dorcas ............... G06Q 10/06398 705/7.42 |
| 2014/0279294 A1 | 9/2014 | Field-Darragh et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351101 A1* | 11/2014 | Danelski ............... G06Q 30/06 705/28 |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0060544 A1 | 3/2015 | Feng et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Scheuren et al. |
| 2015/0071819 A1 | 3/2015 | Todeschini |
| 2015/0083800 A1 | 3/2015 | Li et al. |
| 2015/0086114 A1 | 3/2015 | Todeschini |

(56) References Cited

U.S. PATENT DOCUMENTS

| | | | |
|---|---|---|---|
| 2015/0088522 A1 | 3/2015 | Hendrickson et al. | |
| 2015/0096872 A1 | 4/2015 | Woodburn | |
| 2015/0099557 A1 | 4/2015 | Pettinelli et al. | |
| 2015/0100196 A1 | 4/2015 | Hollifield | |
| 2015/0102109 A1 | 4/2015 | Huck | |
| 2015/0115035 A1 | 4/2015 | Meier et al. | |
| 2015/0120341 A1* | 4/2015 | Scarborough | G06Q 10/02 705/5 |
| 2015/0120514 A1* | 4/2015 | Deshpande | G06Q 30/0635 705/28 |
| 2015/0127791 A1 | 5/2015 | Kosecki et al. | |
| 2015/0128116 A1 | 5/2015 | Chen et al. | |
| 2015/0129659 A1 | 5/2015 | Feng et al. | |
| 2015/0133047 A1 | 5/2015 | Smith et al. | |
| 2015/0134470 A1 | 5/2015 | Hejl et al. | |
| 2015/0136851 A1 | 5/2015 | Harding et al. | |
| 2015/0136854 A1 | 5/2015 | Lu et al. | |
| 2015/0142492 A1 | 5/2015 | Kumar | |
| 2015/0144692 A1 | 5/2015 | Hejl | |
| 2015/0144698 A1 | 5/2015 | Teng et al. | |
| 2015/0144701 A1 | 5/2015 | Xian et al. | |
| 2015/0149946 A1 | 5/2015 | Benos et al. | |
| 2015/0161429 A1 | 6/2015 | Xian | |
| 2015/0169925 A1 | 6/2015 | Chen et al. | |
| 2015/0169929 A1 | 6/2015 | Williams et al. | |
| 2015/0178523 A1 | 6/2015 | Gelay et al. | |
| 2015/0178534 A1 | 6/2015 | Jovanovski et al. | |
| 2015/0178535 A1 | 6/2015 | Bremer et al. | |
| 2015/0178536 A1 | 6/2015 | Hennick et al. | |
| 2015/0178537 A1 | 6/2015 | El et al. | |
| 2015/0181093 A1 | 6/2015 | Zhu et al. | |
| 2015/0181109 A1 | 6/2015 | Gillet et al. | |
| 2015/0186703 A1 | 7/2015 | Chen et al. | |
| 2015/0186836 A1* | 7/2015 | Chouhan | G06F 16/9535 705/28 |
| 2015/0193644 A1 | 7/2015 | Kearney et al. | |
| 2015/0193645 A1 | 7/2015 | Colavito et al. | |
| 2015/0199957 A1 | 7/2015 | Funyak et al. | |
| 2015/0204671 A1 | 7/2015 | Showering | |
| 2015/0253142 A1* | 9/2015 | Kornhauser | G01C 21/3415 701/522 |
| 2015/0327012 A1 | 11/2015 | Bian et al. | |
| 2015/0356481 A1* | 12/2015 | Mains | G06Q 50/28 705/7.13 |
| 2016/0042241 A1 | 2/2016 | Todeschini | |
| 2016/0057230 A1 | 2/2016 | Todeschini et al. | |
| 2016/0125217 A1 | 5/2016 | Todeschini | |
| 2016/0178479 A1 | 6/2016 | Goldsmith | |
| 2016/0189087 A1 | 6/2016 | Morton et al. | |
| 2016/0292477 A1 | 10/2016 | Bidwell | |
| 2016/0314276 A1 | 10/2016 | Wilz et al. | |
| 2016/0314294 A1 | 10/2016 | Kubler et al. | |
| 2016/0377414 A1 | 12/2016 | Thuries et al. | |
| 2017/0212511 A1* | 7/2017 | Paiva Ferreira | G08G 1/22 |

FOREIGN PATENT DOCUMENTS

| | | | |
|---|---|---|---|
| WO | 2013/173985 A1 | 11/2013 | |
| WO | 2014/019130 A1 | 2/2014 | |
| WO | 2014/110495 A1 | 7/2014 | |

OTHER PUBLICATIONS

Advisory Action (PTOL-303) dated Dec. 13, 2019 for U.S. Appl. No. 14/861,270.

Advisory Action (PTOL-303) dated Jan. 24, 2019 for U.S. Appl. No. 14/861,270.

Coulouris, George et al., "Distributed Systems: Concepts and Design (5th Edition)", May 7, 2011, Addison-Wesley, US, pp. 1-85 of 308 pages.

European Extended Search Report in related EP Application 15186746.2, dated Nov. 4, 2015, 9 pages.

Ferraro, Richard et al., "Location-Aware Applications", Jul. 28, 2011, Manning Publications, 252 pages.

Final Rejection dated Nov. 8, 2018 for U.S. Appl. No. 14/861,270.

Final Rejection dated Oct. 16, 2019 for U.S. Appl. No. 14/861,270.

Hutsko, Joe et al., "iPhone All-in-One For Dummies", Dec. 31, 2013, For Dummies, 84 pages.

Jan-Keno Janssen, "Wo bist'n du? Googles Geodienst Latitude", c't Mar. 2011, Jan. 17, 2011 pp. 86-88, [Retrieved from Internet on Jul. 30, 2015 from http://www.heise.de/artikel-archiv/ct/2011/03/086/@00250@/ct.11.03.086-088.pdf]. [online translation].

Joe Hutsko et al; "iPhone All-in-One for Dummies, 3rd Edition", Dec. 31, 2013 ISBN: 978-1-118-72300-5; 13 pages total. (Online Table of Contents only ).

John Frank Weaver; "Robots are People Too; How Siri, Google Car, and Artificial Intelligence Will Force us to Change Our Laws," Nov. 26, 2013; pp. 3-8; Praeger, ISBN: 978-1-4408-2945-1; 8 pages total.

Leonhard Becker: "Die Verstandnisvolle; i0S 6: Siri verbessert, neue Karten, weniger Google" dated Sep. 10, 2012, Retrieved from the Internet: URL:http://www.heise.de/artikel-archiv/ct/2012/20/116@00250@/ct.12.20.116-119.pdf on Aug. 4, 2015; 4 pages.

Non-Final Rejection dated Mar. 6, 2019 for U.S. Appl. No. 14/861,270.

Non-Final Rejection dated May 2, 2018 for U.S. Appl. No. 14/861,270.

Notice of Allowance and Fees Due (PTOL-85) dated Feb. 27, 2020 for U.S. Appl. No. 14/861,270.

Notice of Allowance and Fees Due (PTOL-85) dated Jun. 17, 2020 for U.S. Appl. No. 14/861,270.

Office Action in related European Application No. 15186746.2 dated Jan. 30, 2018, pp. 1-11.

U.S. Patent Application for a Laser Scanning Module Employing an Elastomeric U-Hinge Based Laser Scanning Assembly, filed Feb. 7, 2012 (Feng et al.), U.S. Appl. No. 13/367,978, now abandoned.

U.S. Patent Application for Indicia Reader filed Apr. 1, 2015 (Huck), U.S. Appl. No. 14/676,109, now abandoned.

U.S. Patent Application for Multifunction Point of Sale Apparatus With Optical Signature Capture filed Jul. 30, 2014 (Good et al.), U.S. Appl. No. 14/446,391, now abandoned.

U.S. Patent Application for Multipurpose Optical Reader, filed May 14, 2014 (Jovanovski et al.); 59 pages; U.S. Appl. No. 14/277,337; now abandoned.

U.S. Patent Application for Terminal Having Illumination and Focus Control filed May 21, 2014 (Liu et al.), U.S. Appl. No. 14/283,282, now abandoned.

Vermaat, Misty E., "Discovering Computers: Essential (Shelly Cashman) 1st Edition", Mar. 4, 2013, Course Technology, 85 pages.

Wikipedia, "Graph theory", Internet Article, Sep. 2, 2014, Retrieved from the Internet: URL:https://en.wikipedia.org/w/index.php?title=Graph_theory&oldid=623813468 [retrieved on Jan. 23, 2018], 12 pages.

Wikipedia, "Headset (audio)", Internet Article, Sep. 2, 2014, Retrieved from the Internet: URL:https://en.wikipedia.org/w/index.php?title=Headset_audio&oldid=623845960 [retrieved on Jan. 23, 2018], 6 pages.

Wikipedia, "Location-based service", Internet Article, Aug. 25, 2014, Retrieved from the Internet: URL:https://en.wikipedia.org/w/index.php?title=Location-based_service&oldid=622685188 [retrieved on Jan. 23, 2018], 12 pages.

Wikipedia, "Siri", Internet Article, dated Sep. 22, 2014, Retrieved from the Internet: URL:https://en.wikipedia.org/w/index.php?title=Siri&oldid=626676542 on Oct. 26, 2015; 9 pages.

Coulouris, George et al., "Distributed Systems: Concepts and Design (5th Edition)", May 7, 2011, Addison-Wesley, US, pp. 86-308 of 308 pages.

* cited by examiner

SYSTEM AND METHOD FOR WORKFLOW MANAGEMENT

CROSS-REFERENCE TO RELATED APPLICATION(S)

The present application claims the benefit of priority and is a continuation of U.S. patent application Ser. No. 14/861,270 entitled System and Method for Workflow Management filed on Sep. 22, 2015 which claims the benefit of priority of U.S. Provisional Application No. 62/056,327 for a System and Method for Workflow Management filed on Sep. 26, 2014. The foregoing patent applications are hereby incorporated by reference in their entirety.

FIELD OF THE INVENTION

The present invention relates to information systems. More specifically, the present invention relates to a system and method for workflow management.

BACKGROUND

Wearable, mobile, and/or portable computer terminals are used for a wide variety of tasks. Such terminals allow the workers using them ("users") to maintain mobility, while providing the user with desirable computing, data gathering, and data-processing functions. Furthermore, such terminals often provide a communication link to a larger, more centralized computer system. One example of a specific use for a wearable terminal is a product or warehouse management system (e.g., WMS) that involves product distribution and tracking as well as product inventory management.

Computerized product management systems with portable terminals are used in various inventory/order-based industries, such as food and retail product distribution, manufacturing, and quality control. An overall integrated product management system may utilize a central computer system that runs a program for product tracking and management and for order filling. A plurality of mobile terminals is employed by the user of the system to communicate with the central system for the product handling. The users perform manual product picking and placement tasks per instructions through the terminals provided by the central system. The terminals also allow the users to interface with the computer system, such as to respond to inquiries or confirm the completion of certain tasks. Therefore, an overall integrated management system involves a combination of a central computer system for tracking and management, mobile devices (e.g., wearable terminals), and the people who use and interface with the computer system in the form of order fillers, pickers (e.g., selection operators) and other workers. The workers handle the manual aspects of the integrated management system under the command and control of information transmitted from the central computer system to the wireless wearable terminal.

One particularly efficient system is a voice-directed system that utilizes voice-directed work. More specifically, to provide an interface between the central computer system and the workers or other users, such wearable terminals and the central systems to which they are connected are often voice-driven or speech-driven (e.g., operated or controlled at least in part using human speech). A bi-directional communication stream of information is exchanged, typically over a wireless network, between the wireless wearable terminals and the central computer system. Information received by each wireless wearable terminal from the central system is translated from text into voice instructions or commands for the corresponding worker. Typically, to communicate in a voice-driven system, the worker wears a headset, which is communicatively coupled to a wearable or portable terminal. The headset has a microphone for voice data entry and an ear speaker for playing instructions (e.g., voice instructions). Through the headset, the workers are able to receive voice instructions about their tasks, ask questions, report the progress of their tasks, and report working conditions, such as inventory shortages.

An illustrative example of a set of worker tasks suitable for a wireless wearable terminal with voice capabilities may involve initially welcoming the worker to the computerized inventory management system and defining a particular task or order, for example, filling a load for a particular truck scheduled to depart from a warehouse. The worker may then answer with a particular area (e.g., freezer) that he will be working in for that order. The worker may then be directed to pick items to fill a pallet or bin used for the order. Specifically, the system vocally directs the worker to a particular aisle and bin to pick a particular quantity of an item. The worker then vocally confirms the location that they have gone to and vocally confirms the number of picked items and/or various other information about the picked items. Once the bin or pallet is filled, the system may then direct the worker to a loading dock or bay for a particular truck to receive that order. As will be appreciated, the specific communications between the wireless wearable terminal and the central computer system for such voice-directed work can be task-specific and highly variable.

The mobile terminals and voice-directed work provide a significant efficiency in the performance of the workers' tasks. Specifically, using such terminals, the data-processing work is done virtually hands-free without cumbersome equipment to juggle or paperwork to carry around.

While the utilization of voice-directed mobile terminals tends to improve worker efficiency, existing impediments remain to achieving maximized workflow. For example, shorting occurs when the worker proceeds as instructed to a pickup location (e.g., pickface), but finds that there is not enough product at the pickface to fulfill the order. Additionally, a worker may proceed to the wrong location. This may occur when the worker improperly carries out the instructions as a result of inattentiveness, for example.

Accordingly, a need exists for a workflow management system that analyzes workflow efficiency based at least in part on data retrieved from a voice-directed mobile terminal. A need also exists for a method of workflow management that analyzes workflow efficiency based at least in part on data retrieved from a voice-directed mobile terminal.

SUMMARY

Accordingly, in one aspect, the present invention embraces a workflow management system for managing the storage, retrieval and transport of items (e.g., products, goods, etc.) in a warehouse includes a voice-directed mobile terminal (e.g., portable or wearable computerized mobile device). The system also includes a server computer in communication with the voice-directed mobile terminal. The server computer includes a tasking module for transmitting task data to the voice-directed mobile terminal. The server computer also includes a workflow-analysis module for generating, based at least in part upon an analysis of workflow dialog between the voice-directed mobile terminal and the user, performance data relating to the performance (e.g., physical performance) of tasks associated with the storage, retrieval, and/or transport of the items.

In one exemplary embodiment, the performance data includes shorting information.

In another exemplary embodiment, the shorting information includes a shorting rate.

In yet another exemplary embodiment, the shorting information includes the calculated time wasted due to a shorting incident.

In yet another exemplary embodiment, the time wasted due to a shorting incident is calculated based at least in part upon travel distances derived from a digitized map of the warehouse.

In yet another exemplary embodiment, the time wasted due to a shorting incident is calculated based at least in part upon historical travel times.

In yet another exemplary embodiment, the time wasted due to a shorting incident is calculated based at least in part upon a rational construction of location identifiers.

In yet another exemplary embodiment, the time wasted due to shorting includes time spent performing follow-up activities.

In yet another exemplary embodiment, the performance data includes wrong location information.

In yet another exemplary embodiment, the performance data includes unproductive time information.

In yet another exemplary embodiment, the performance data includes an item's order frequency.

In yet another exemplary embodiment, the performance data includes overtime information.

In yet another exemplary embodiment, the performance data includes recognition information.

In yet another exemplary embodiment, the performance data includes communications network information.

In yet another exemplary embodiment, the performance data includes user confusion information.

In yet another exemplary embodiment, the performance data includes an operator-pick-instance-profile.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
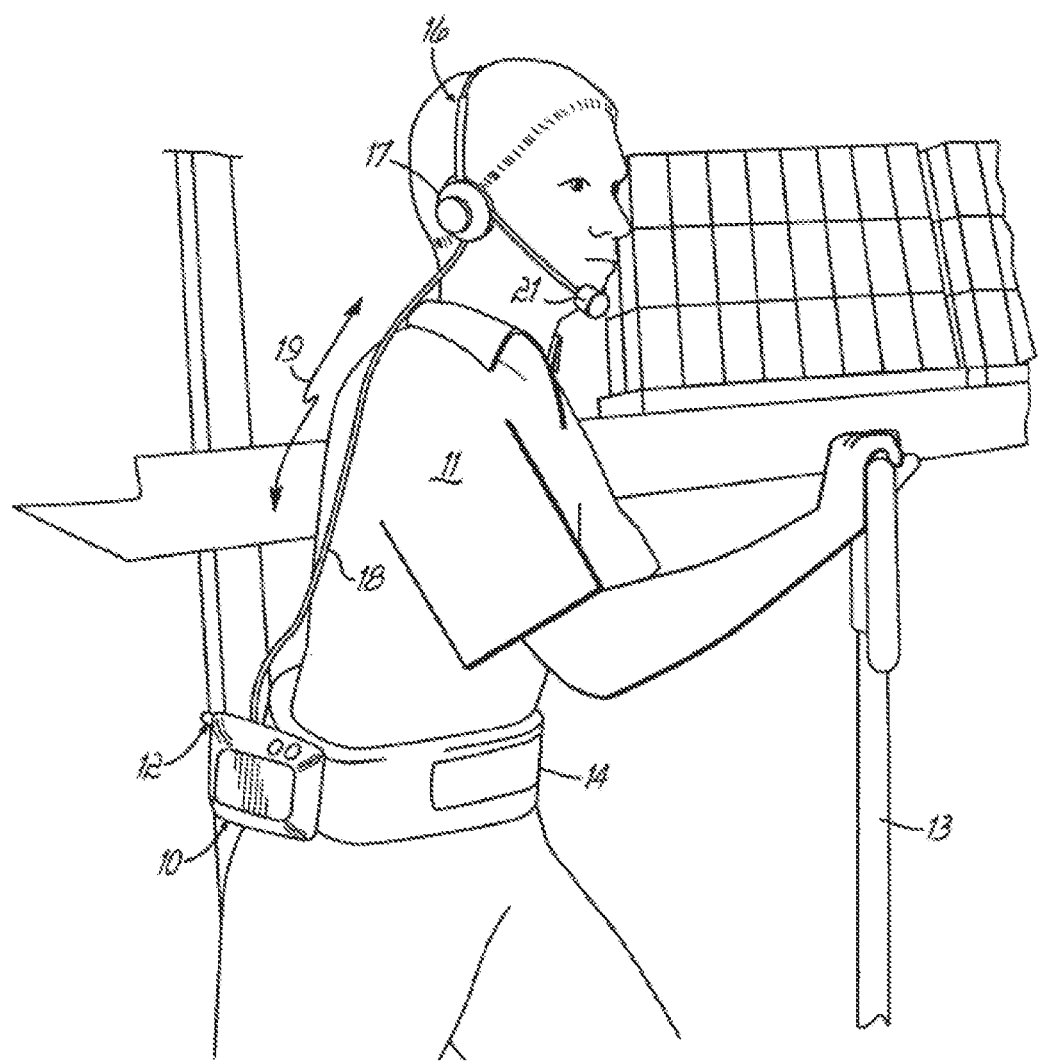
FIG. 1 is a perspective view of a worker using an exemplary voice-directed mobile terminal of a workflow management system in accordance with the present disclosure.

The present invention embraces a workflow management system. The workflow management system analyzes data generated during, by and through the performance of workers utilizing the system. Typically, at least a portion of the analyzed data is generated by, or used in connection with, a voice-directed mobile terminal. FIG. 1 depicts an exemplary voice-directed mobile terminal 10 that may be used in accordance with the workflow management system according to the present disclosure. The voice-directed mobile terminal 10 may be a wearable device, which may be worn by a worker 11 (e.g., on a belt 14) or other user or operator (hereinafter generally "the user"). This allows for hands-free operation. The user 11 is shown operating a piece of transportation equipment 13, such as a pallet jack. The voice-directed mobile terminal 10 might also be manually carried or otherwise transported on a piece of equipment, such as on a pallet jack or industrial vehicle (e.g., forklift).

The use of the term "terminal" herein is not limited and may include any similar computer, device, machine, smartphone, smartwatch, indicia reader, combination, or system. Furthermore, the voice-directed mobile terminal 10 may include multiple pieces with separate housings or may be contained in a single housing similar to the embodiment shown in FIG. 1. Therefore, the terminal 10 may also include multiple wearable pieces as described below. Alternatively, some or all of the terminal functionality may be incorporated into the headset 16, which may include all the features required to communicate with a server computer. Therefore, the exact form of the voice-directed mobile terminal 10 utilized to practice the present system and method is not limited to only the embodiments shown in the drawings.

Figure 2:
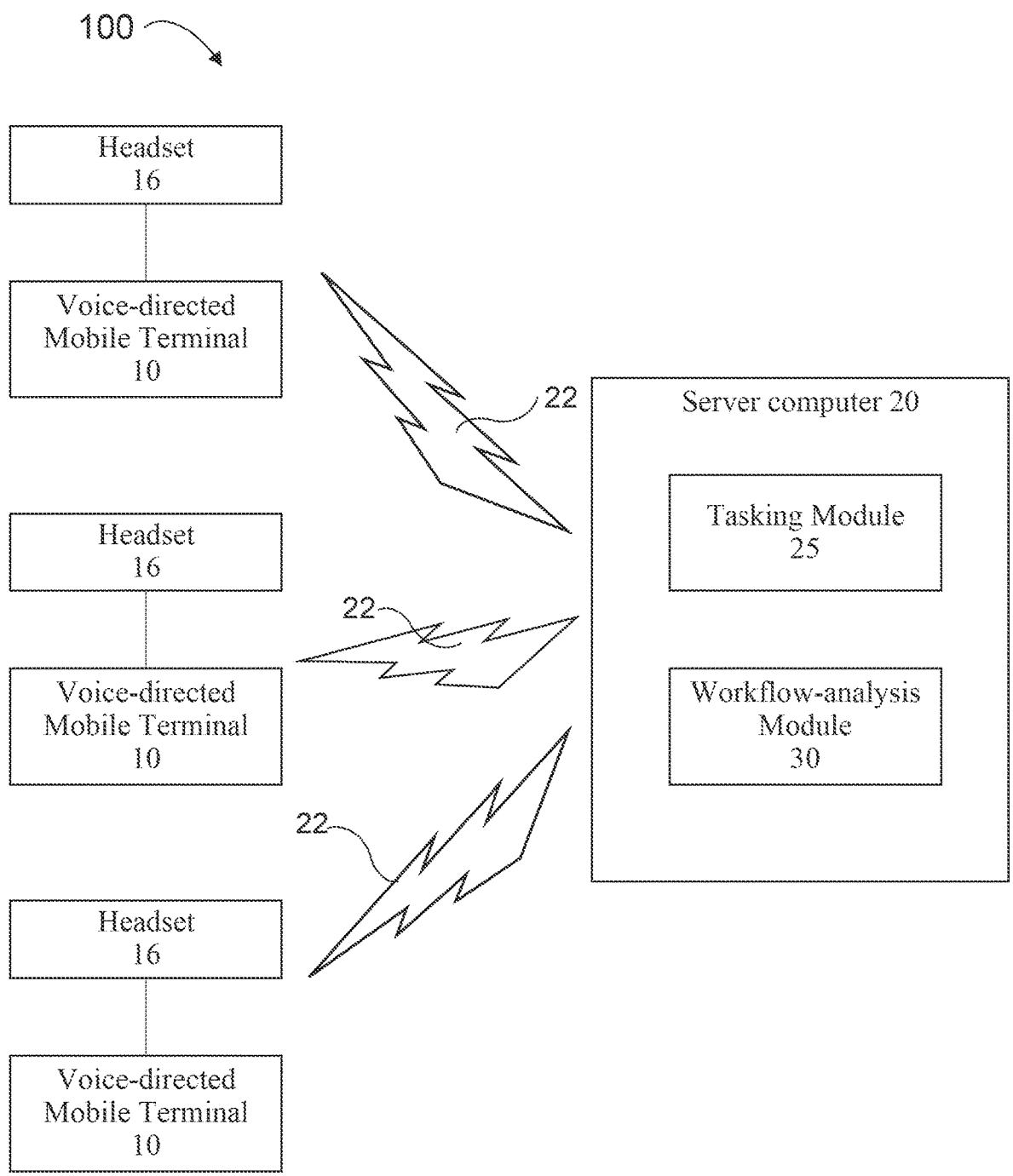
FIG. 2 is a flow chart illustrating an exemplary workflow management system according to the present disclosure.

The voice-directed mobile terminal 10 is typically a voice-driven device that includes speech interfaces to permit a user 11 to communicate, using speech or voice, with the server computer 20 as shown in FIG. 2. Typically, the voice-generated mobile terminal's speech interfaces are configured to be capable of permitting multiple different users to communicate with the server computer (e.g., using speech-recognition technology that recognizes different English dialects or even different languages altogether). It will be appreciated by a person of ordinary skill in the art that the server computer 20 may be one or, more typically, a plurality of computers having software stored thereon. The server computer 20 may run one or more system software packages for handling a particular task or set of tasks, such as inventory and warehouse management systems (which are available in various commercial forms), or any other systems where multiple tasks are handled by multiple workers. The server computer 20 may be any of a variety of different computers, including both client and server computers working together, and/or databases and/or systems necessary to interface with multiple voice-directed mobile terminals 10 and associated with multiple different workers, provide the work tasks and teach the products or other items handled in the voice-directed work environment. The server computer 20 may include a Warehouse Management System (WMS), a database, and a Web application. The server computer 20 might also include a computer for programming and managing the individual voice-directed mobile terminals 10. The server computer 20 may be located at one facility or be distributed at geographically distinct facilities. Furthermore, the server computer 20 may include a proxy server. Therefore, the server computer 20 is not limited in scope to a specific configuration.

Alternatively, the voice-directed mobile terminals 10 may be stand-alone devices which interface directly with a user 11 without a server computer. Therefore, various aspects of the present disclosure might be handled with voice-directed mobile terminals only. Usually, however, to have sufficient database capability to handle large amounts of information, a server computer is desirable.

In an exemplary embodiment, the voice-directed mobile terminal 10 communicates with the server computer 20 using a wireless communication link 22. The wireless link may be through an appropriate wireless communication format (e.g., 802.11b/g/n) and may use one or more wireless access points that are coupled to the server computer 20 and accessed by the voice-directed mobile terminal 10. To allow the user to communicate with the system, one or more peripheral devices, such as a headset 16 (e.g., earpiece, earbuds, etc.), are coupled to the voice-directed mobile terminal 10. The headset 16 may be coupled to the voice-directed mobile terminal 10 with a cord 18 or by a wireless headset connection 19 (e.g., using the BLUETOOTH wireless protocol). The headset 16 is worn on the head of the user/worker and uses a microphone 21 for directing voice responses to the voice-directed mobile terminal 10. A headset speaker 17 provides (e.g., plays) voice commands to the user 11. The voice-directed mobile terminal 10 thus carries on a speech dialog with a user 11 and provides hands-free operation and voice-directed movement throughout a warehouse or other facility.

It will be appreciated by a person of ordinary skill in the art that, although exemplary embodiments presented herein incorporate voice-direction techniques, the present disclosure is not limited to speech-directed terminals. The present disclosure embraces any terminal that carries on a dialog, speech, text (e.g., through a keyboard), gestures, or other communicative activity, with a user.

The server computer 20 includes a tasking module 25 for transmitting specific task data (e.g., picking instructions, training information, scheduling information, or other information associated with a request for a worker to perform some task or provide some information) to the voice-directed mobile terminal 10. Typically, the tasking module 25 is a software module stored on the server computer 20. Alternatively, the tasking module 25 may be a hardware module, or a combination of hardware and software. The voice-directed mobile terminal 10 uses the task data received from the tasking module 25 to generate audio outputs at the headsets and speakers. For example, text data is converted using a text-to-speech (TTS) interface to provide voice direction to a user. Speech input or feedback from a user is generated at the headset microphone 21 and transmitted to the voice-directed mobile terminal 10 where it is processed by speech recognition circuitry or other speech processing circuitry (e.g., speech recognition software). Any data that is obtained from the voice dialog (e.g., user speech data) may then be relayed to the server computer 20.

For example, in one typical workflow management system 100, the voice-directed mobile terminal 10 receives instructions (e.g., task data) from the tasking module 25 and converts those instructions into an audio transmission (e.g., audio file) to be heard by a worker/user 11 via a speaker 17. The user executes the audio instructions and, for example, goes to a designated location and picks a designated product or performs some other task communicated by the audio instructions. The user 11 then replies into the microphone 21, in a spoken language, such as with a verification of a location and/or a product, and the audio reply is converted to a useable data format (e.g., user speech data) to be sent back and processed by the server computer 20. That is, in the voice-directed or speech directed work context, the user 11 maintains a speech dialog (e.g., workflow dialog) with the voice-directed mobile terminal 10 and/or server computer 20 to execute and complete a variety of tasks.

To achieve greater efficiencies in the performance of tasks by workers, the server computer 20 of the system according to the present disclosure includes a workflow-analysis module 30. Typically, the workflow-analysis module 30 is a software module stored on the server computer 20. Alternatively, the workflow-analysis module 30 may be a hardware module, or a combination of hardware and software. The workflow-analysis module 30 generates, based at least in part upon an analysis of the workflow dialog between the voice-directed mobile terminal 10 and the user 11, performance data. The performance data relates to the performance of tasks associated with the storage, retrieval, and/or transport of items in the warehouse.

The performance data generated by the workflow-analysis module 30 may be viewed by a user 11, such as a workforce supervisor overseeing the performance of picking operators on a warehouse floor, on a display device (e.g., LCD monitor) in communication with the server computer 20. The workflow management system 100 may display the performance data in raw form or in a compiled form (e.g., a summary report), thereby providing the user 11 with information regarding the performance of tasks by the overall workforce (e.g., selection operators working a warehouse floor), a selected subgroup of the workforce, or an individual member of the workforce. In this way, the workflow management system 100 according to the present disclosure allows the user 11 to identify inefficiencies in the performance of tasks relating to the storage, retrieval, and/or transport of items in the warehouse. Typically, the workflow management system 100 is configured to receive and display at least a portion of the performance data in real time, thereby allowing the workforce manager to take immediate corrective action to remedy the reported inefficiency, mistake, or other problem. As will be discussed in greater detail below, the workflow management system 100 may be configured to provide performance data associated with a variety of factors tending to influence the overall performance of the workflow management system 100.

Although exemplary embodiments of the present disclosure relate to a warehouse setting, it will be appreciated by a person of ordinary skill in the art that the present disclosure embraces systems and methods that may be used in connection with other environments. For example, and without intending to limit the present disclosure, the systems and methods according to the present disclosure may be used in a retail store setting, a pharmacy setting, or a transport vehicle. The term warehouse, therefore, is used in its broadest sense and is not intended to limit the application of the disclosure to a particular physical environment.

In an exemplary embodiment of the workflow management system 100 according to the present disclosure, the workflow-analysis module 30 generates performance data that includes shorting information. Shorting information is data relating to instances (or lack of instances) of shorting. Shorting occurs when a user 11 is directed by a voice-directed mobile terminal 10 to retrieve (e.g., pick) a specified quantity of an item from a location, but the user 11 is unable to comply fully because there are not enough items at the location to fulfill the request.

More specifically, a user 11 (e.g., selection operator) utilizing a voice-directed mobile terminal 10 in a warehouse setting may be directed to a location within the warehouse. This specific location is typically referred to as a pick-face location. A pick-face is that portion of the warehouse that stores items for retrieval (e.g., picking) by users, usually the bottom two rows of racking. The user 11 is directed by the voice-directed mobile terminal 10 to pick a specified quantity of an item (e.g., product) from the pick-face location. Items at a pick-face location are generally stored in bins or pallets. Depending on availability of the item and the efficacy of the replenishment (e.g., re-stocking) processes, the specified quantity of the item may not be available when the user 11 arrives at the pick-face. The user 11 may only be able to pick N of M items (e.g., two items, where the specified quantity was three items). Other times, no product may be present at the specified pick-face location. An instance of this type is known as a "short product" or "short" situation or simply a "short".

Shorts tend to be costly for a business because the product quantities specified to the user for retrieval are necessary to fulfill an order(s). When a user travels to and from a location where a short occurs, at least some portion of the users travel time is wasted. Furthermore, unless the order goes unfulfilled, a user (perhaps the same user) must revisit the location to make another attempt to fulfill the specified quantity. These instances of returning to a location to fulfill a retrieval task previously thwarted by a short are typically referred to as "go backs," "chase assignments," or "repicks". The time required for a repack also represents time wasted as a result of a short.

Shorts often result in a deviation from optimal routing paths for users engaged in a selection assignment (e.g., a picking task). When multiplied across a large amount of time and/or a large number of users, such deviations can result in a significant amount of wasted time. This wasted time can impact a business' ability to satisfy customer orders in a timely fashion, and it can impact a business' costs (e.g., employee compensation costs expended on wasted time). Additionally, shorts can result in trickle-down consequences and side-effects that can be difficult to measure. For example, sending selection operators to unnecessary locations either once or for repeat visits to secure previously-shorted items can cause aisle or lane congestion. This congestion can negatively impact other selection operators who are also in the process of fulfilling orders. Delays in order fulfillment caused by congestion or other side-effects can result in shift overtime to fulfill those orders.

Additionally, a problem of "cascading" shorts can be encountered. Cascading shorts occur when an operator is sent to a specified location and experiences a short, and subsequently one or more shorts are experienced at the same location by the same selection operator or a different selection operator. Cascading shorts typically occur because the item is not properly replenished upon occurrence of the initial short.

Shorts can insidiously erode the efficiency of warehouse workflow because warehouse supervisors may be unaware of the incidence rate and cost associated with shorting. As such, workflow-analysis module 30 according to the present disclosure is configured to more readily identify instances of shorting, as well as determining the overall consequences of shorting.

The workflow-analysis module 30 analyzes the workflow dialog between the voice-directed mobile terminal 10 and the user 11 to identify instances of shorting. Instances of shorting, and data related thereto, are referred to as shorting information. Shorting information is included in the performance data that provides an overview of the overall efficiency with which warehouse tasks are being performed.

Typically, the workflow dialog is captured (e.g., recorded, captured, stored) by the voice-directed mobile terminal 10. As mentioned, the workflow dialog typically includes the directions (e.g., audible instructions) given by the speech out functionality of the voice-directed mobile terminal 10, as well as utterances by the user 11 as secured through speech recognition techniques. Typically, workflow dialog is captured as UTF-8 alphanumeric text strings. The workflow dialog is generally forwarded (e.g., transmitted) over a communications network 22 to the workflow-analysis module 30 of the server computer 22. Once received by the workflow-analysis module 30, the workflow-analysis module 30 can isolate those portions of the workflow dialog relating to interactions concerning shorting and time lost. The workflow-analysis module 30 typically isolates the relevant portions of workflow dialog by identifying key words or phrases relating to shorting. By way of example, consider the following exemplary workflow dialog:

Terminal: "Go to room 14, aisle 7, slot 23"
User: "331" (checkdigit confirming location)
Terminal: "Pick five."
User: "Five" (for confirmation)
Terminal: "Go to aisle 11, slot 13" (same room)
User: "225" (checkdigit)
Terminal: "Pick three."
User: "0"
Terminal: "Asked for 3, you said 0; is this a short product?"
User: "Yes"
Terminal: "Go to . . . " (Pick completed; go to next location)

In the above exemplary workflow dialog, each captured expression can be uniquely identified and parsed into its constituent components, including the following components:

The locations to which the user was directed;
The travel time between locations, as calculated by the time between the current travel prompt (e.g., "Go to aisle 11, slot 13) and the user-spoken checkdigit;
The time at the pick-face, as calculated by the time from the spoken checkdigit to the next travel prompt;
The actual distance or travel distance approximation (relative or otherwise) in view of the previous, current and next travel locations provided by the voice-directed mobile terminal; and
The indication that a short was made, as constituted by an unexpected quantity, a prompt for confirmation of a short product, and an affirmative response by the user. (In other cases, the user might speak "short product" or a similar keyword or phrase).

Values for each of the above-listed constituent components of the workflow dialog can be stored in a field in an electronic message for immediate processing. Alternatively, the values may be stored in a database of the server computer 20 for later analysis or re-analysis.

In addition to identifying instances of shorts, the workflow-analysis module 30 includes within its compilation of shorting information a determination of the cost of shorting. By including an analysis of the cost of shorting, the system is better able to impress upon system users (e.g., warehouse supervisors, management, etc.) the importance of taking action to reduce or eliminate shorts.

The workflow-analysis module 30 may utilize various methods to calculate the business costs associated with shorts. Consider the situation in which the user travels from point A to B to C (e.g., A-B-C) for a sequence of picks. If B is a zero-quantity short incident (e.g., a "zero-quantity short"), then travel from A to B and from B to C was at least partially unnecessary to the degree that the travel from A to B does not overlap with travel from A to C. In some cases (e.g., where B and C are adjacent slots), the difference of A-B-C and A-C are minimal.

If an XYZ-coordinate spatial map of the warehouse is available in a form that can be digitized, then calculating the respective distances between points (and discrepancies between alternate routes) is a matter of path construction and geometry. Other details such as one-way travel through aisles or no travel zones may also be considered. Utilization of a warehouse map is a relatively accurate way to calculate travel distance and corresponding time lost due to unnecessary travel caused by shorts. A map may not always be feasible or available, however. For example, the costs of acquiring, digitizing, and maintaining a map may be prohibitive.

A second approach to determining the travel time lost due to shorts is to track and store all instances of travel, or at least summary statistics of travel segments as reported by the workflow management system (e.g., mean, standard deviation, quantiles, etc.). These values may be stored as a key-value map of travel segment specification (A-B), for example. In the above example shorting instance, the travel time for segments A-B and B-C are known because they are inherent to the shorting event. Therefore, only the travel time for A-C would need to be looked up. Depending on the size of the warehouse and workforce, as well as the duration of tracking travel distances, a segment-to-segment database of travel times may, in practice, be insufficiently populated to provide reliable travel time estimates for some (or perhaps many) segments.

A third approach to determining the travel time lost due to shorts relies upon a rational construction of location identifiers. For example, if location A is associated with "area 5, aisle 16, slot 2" and location B is associated with "area 5, aisle 17, slot 7," then a distance metric can be calculated. While not exact in its measurements, the distance metric contributes a sense of relative distances between pick-face locations. At a minimum, this technique allows the scoring of potential travel losses (e.g., more severe, less severe, etc.). Segmenting the slot locations within an aisle into groups identifying the right, middle and left portions could further refine the travel calculation. When complemented with the travel time inherent in a shorting scenario, as well as any other location segment travel time already stored (e.g. cached), this approach yields more precise information than any of the three approaches discussed herein could when used alone.

When determining time lost due to zero-quantity shorts, the workflow-analysis module 30 typically also accounts for follow-up actions that are required to remedy the short. For example, the workflow-analysis module typically accounts for time expended for repicks. The workflow management system 100 according to the present invention may adopt a specialized vocabulary for identifying remedial actions such as repicks. In other words, the system's library of recognized speech may include words relating to remedial activities such as repicks. For example, when a user 11 initiates a repick, the user 11 may speak the word "repick," which alerts the workflow-analysis module to associate the corresponding travel time with activity to remedy a short. This time spent remedying a short may also be included in the shorting information compiled by the workflow-analysis module 30.

In addition to the problem of zero-quantity shorts, reduced-quantity shorts occur when the quantity picked by the user 11 is greater than zero but less than the quantity prescribed by the voice-directed mobile terminal (in response to task data received from the tasking module 25). In other words, a reduced-quantity short occurs when the item is present at the identified pick-face location, but not in sufficient quantity to fulfill the order. In situations involving a reduced-quantity short, travel to and from the pick-face location, and the time spent at the pick-face, may not be considered by the workflow-analysis module 30 as wasted time (because at least some of the items were retrieved and/or orders were fulfilled). Follow-up activities (e.g., repicks) associated with a reduced-quantity short, however, would typically be included in the workflow-analysis module's calculation of wasted time associated with the short.

As mentioned above, shorts can result in side-effects, such as congestion, that may be hard to discern and calculate. To provide a more comprehensive accounting of the costs associated with shorts, the workflow analysis module 30 according to the present disclosure may incorporate congestion costs into its determination of overall shorting costs (e.g., shorting information), which are in turn included in the performance data. Congestion costs arising from shorting may be determined (e.g., estimated) by (a) finding instances where users (e.g., selection operators) are roughly within the same location (e.g., the same aisle) at the same time, or locations where multiple users are anticipated to be traveling to/from within a short time period; (b) correlating those instances with increases in travel time to/from those locations; (c) where a correlation exists, developing descriptive statistics around the difference in time between the congested activity and congestion-free activity; and (d) determining which of the instances are due to zero-quantity shorts or follow-up activities, and summing that time to arrive at a total cost effect (in time) due to shorting.

In an exemplary embodiment of the workflow management system 100 according to the present disclosure, the workflow-analysis module 30 generates performance data that includes wrong location information. Wrong location information is data associated with an instance where a user 11 (e.g., selection operator) travels to a location other than the location to which the user was directed by the voice-directed mobile terminal 10. There may be a variety of reasons why a user would go to the wrong location. For example, the user may have difficulty navigating the warehouse and/or understanding the warehouse's organizational structure. Whatever the cause, going to the wrong location can result in significant costs in terms of travel time (e.g., to and from the wrong location) and potential product selection errors. Incidences of wrong location may increase according to the experience level of the user, the turnover rate of the warehouse workforce, and the size and layout of the warehouse. Without properly identifying wrong location instances, warehouse managers may be largely unaware of the problem because, for example, it may not be apparent that a user is having difficulty navigating the warehouse. Because the workflow-analysis module 30 according to the present disclosure is configured to identify instances of wrong location, warehouse managers can be apprised of such problems and take remedial action (e.g., employee training). In this way, the present system 100 can make the sometimes-insidious problem of wrong location visible to business managers so that corrective action may be taken to avoid potentially substantial business costs associated with these errors.

Typically, the workflow-analysis module 30 is alerted to an instance of a wrong location when a user reports an unexpected checkdigit. As discussed above, checkdigits are typically random alphanumeric expressions (e.g., "6853") that are positioned (e.g., posted) at a pick-face location. When the user arrives at a location, the user utters the checkdigit, which the system 100 then uses to verify that the correct location has been reached. Where the incorrect checkdigit is uttered, the workflow-analysis module 30 may determine the instance of wrong location by analyzing the workflow dialog for relevant keywords or phrases. For example, a voice-directed mobile terminal's expression of "Incorrect checkdigit" would alert the workflow-analysis module 30 that a wrong location instance may have occurred.

The workflow-analysis module 30 may employ a probabilistic algorithm that takes one or more of the following factors into account to establish an increasing level of confidence that a user has traveled to a wrong location:

(A) All N (e.g., 3) digits in the attempt at the checkdigit are recognized as different (e.g., by digit) than what is expected at the pick-face (for example, if the user is recognized as saying "1-2-3" when the expected checkdigit is "4-5-6," the workflow-analysis module 30 can safely assume that the checkdigit error is due to wrong location (as opposed to transposed digits, for example));

(B) The rejected checkdigit is an actual checkdigit corresponding to an alternate location in the warehouse (or an actual alternative checkdigit with transposed numbers);

(C) The same incorrect checkdigit is spoken more than once in the same instance of selecting from a pick-face (e.g., in response to a checkdigit re-confirmation request);

(D) The user queries the system for the desired location via a keyword or key phrase such as "location" or "where am I" in an attempt to refresh the user's understanding of the proper specified pick-face location;

(E) A significant pause is detected after a checkdigit attempt is rejected, thereby potentially indicating hidden travel time by the user while in transit from a wrong location to the proper location, the arrival at which is indicated by a delayed utterance of the correct checkdigit.

In addition to the above factors that may be indicative of a wrong location, if the location information (e.g., area, aisle, slot) communicated to the user via speech out is rational in its construction, then a distance metric may be established between locations to provide relative distances between any location in question in the interaction. Distance values between spoken and expected checkdigit locations may, in turn, provide some confidence regarding hidden travel time. In particular, to the extent that a correct location is more distant from the user's current location (as indicated by the incorrect checkdigit), hidden travel time becomes easier to detect. Furthermore, relative distance information may be utilized by the workflow-analysis module 30 to identify the most egregious cases of wrong location. Alternatively, or in addition, where a database of distances and/or records of travel times between segments is available, the workflow-analysis module 30 may use this database information to inform hidden travel times.

Yet another factor that may, in some instances, be indicative of wrong location involves the use of wireless network connectivity information. Typically, a voice-directed mobile terminal 10 is communicatively connected to the communications network 22 via a wireless connection (e.g., 802.11b/g/n, WiFi, GPRS, etc.). This allows for greater mobility as the user moves about the warehouse. The workflow-analysis module 30 may analyze wireless connectivity information as an indicator of whether a wrong location has occurred. For example, the workflow-analysis module 30 may determine which wireless access point the user is connected to at the time of the checkdigit utterance. Where the detected wireless access point does not provide wireless coverage (e.g., due to distance limitations) at the location of the checkdigit utterance, then a wrong location is indicated. This may be referred to as "WiFi fingerprinting." Because access point signal strength and coverage tend to vary significantly, this approach typically only complements the overall wrong location analysis performed by the workflow-analysis module 30.

As mentioned, one or more of the above-discussed factors may be used by the workflow-analysis module 30 in identifying instances of wrong location. Once a sufficient amount of data relating to these factors has been collected by the system, the workflow-analysis module 30 may initiate statistical analysis to assign scores or probabilities to these factors. These scores or probabilities may be additionally informed by information relating to human observation and/or expert opinion. Probability or scoring thresholds can then be established to identify the most likely or acceptable instances of wrong location.

As mentioned, there can be significant costs incurred by a business as a result of instances of wrong location. Addressing the cost of wrong locations can be approached in a number of ways, including: (a) prevention of travel to a wrong location; (b) interruption of travel to a wrong location; and (c) identification of wrong location followed by alerting the user to allow for fast recovery.

In an exemplary embodiment, the workflow-analysis module 30 is configured to notify system users (e.g., supervisors) that a wrong location problem is significant and, therefore, merits corrective action. Corrective (e.g., preventative) action may include supplemental employee training and orientation; alterations to warehouse layout, signage, and/or other indicators of location and travel routes. Individuals who are having a particularly difficult time with travel to wrong locations may be identified through such analysis and counseled to improve their performance. If repeat locations and/or users (e.g., selection operators) are identified by the workflow-analysis module 30, the system 100 may take proactive action in directing a particular user (e.g., through more explicit instructions).

In addition to post hoc analysis described above, the above-described confidence factors relating to wrong location can be used by the system 100 to alert a user in real time that the user is at the wrong location. For example, the user could be alerted by a recognizable audio tone (e.g., audio tone sequence) and/or a location prompt. The alert may also include instructions directing the user to the correct location. This real-time feedback approach may significantly reduce recovery time experienced as a result of wrong location.

In an exemplary embodiment of the workflow management system 100 according to the present disclosure, the workflow-analysis module 30 generates performance data that includes unproductive time information. Unproductive time information includes a quantification of time spent by a user outside of assignment-related activities. This may include time spent signing on to the voice-directed mobile terminal 10, time spent between assignments and break time. By allowing users (e.g., warehouse supervisors) to examine summaries of unproductive time, measures may be employed to reduce such waste.

In an exemplary embodiment of the workflow management system 100 according to the present disclosure, the workflow-analysis module 30 generates performance data that includes an item's order frequency. Order frequency information relates to items identified as experiencing increases or decreases (e.g., rapid increases/decreases) in their order frequency. Identifying such "hot" or "cold" items can be useful for purposes of reslotting (e.g., relocating to another pick-face location) items for more efficient picking assignments. For example, items experiencing higher order frequencies may be reslotted into highly traveled areas. This may occur, for example, in relation to seasonal items.

In an exemplary embodiment of the workflow management system 100 according to the present disclosure, the workflow-analysis module 30 generates performance data that includes overtime information. Overtime information is associated with quantities of employee overtime (e.g., overtime hours), and may include information relating to potential causes for overtime in relation to days against which overtime was not necessary.

In an exemplary embodiment of the workflow management system 100 according to the present disclosure, the workflow-analysis module 30 generates performance data that includes recognition information. Recognition information may include information regarding quantity and frequency of checkdigit substitutions. Analysis of recognition information may lead to recommendation of corrective measures such as retraining of digital templates.

In an exemplary embodiment of the workflow management system 100 according to the present disclosure, the workflow-analysis module 30 generates performance data that includes communications network information. Network information includes data relating to the performance of the communications network being used by the system 100. In particular, communications network information relates to the quality of the communication connection between the voice-directed mobile terminal 10 and the server computer 20. Instances of poor network communication may result in user downtime due to an inability to receive task data, for example. A variety of factors may contribute to poor network communication, including faulty hardware and signal interference.

In an exemplary embodiment of the workflow management system 100 according to the present disclosure, the workflow-analysis module 30 generates performance data that includes user confusion information. User confusion information includes data relating to a user's (e.g., selection operator) inappropriate usage of system vocabulary, asking for help, or high levels of per-transaction interaction with the voice-directed mobile terminal 10.

In an exemplary embodiment of the workflow management system 100 according to the present disclosure, the workflow-analysis module 30 generates performance data that includes an operator-pick-instance-profile. An operator-pick-instance-profile provides a comprehensive view of a particular user's (e.g., selection operator) performance of tasks relating to the storage, retrieval and movement of items in the warehouse. Again, the workflow-analysis module 30 analyzes the workflow dialog to build an operator-pick-instance-profile. At the lowest level, this includes parsing the workflow dialog for interaction counts, vocabulary usage, dates and times, durations, locations, quantities, and product or container identifiers. Additionally, higher-level contextual information can be derived from the low-level data to arrive at shift information, break times, tardiness, and so on.

An operator-pick-instance-profile may include data relating to the number of interactions required for a pick; the specific use of vocabulary and number of instances of each; timings associated with interactions; pick rates and changes in velocity; quantities picked; and product or container identifiers in play. Some user (e.g., selection operator) or shift-specific information may also be relevant as background information bearing on a particular pick. This may include time since last break; relative performance today versus average historical performance; tardiness or break abuse; day of the week; time of day; shift number; proximity to break time; proximity to quitting time, etc. By compiling all of this data, the workflow-analysis module 30 is able to create a quantifiable profile (e.g., a "feature vector") for any particular pick at a slot. As picks happen, data can be captured in real time, and profiles for each pick may be assembled and stored for subsequent analysis in a database as an operator-pick-instance-profile.

Certain embodiments of the voice-directed mobile terminal 10 may include a variety of sensors and accessory components, including, for example, radios, accelerometers, gyroscopes, compasses, ambient light sources, background noise reducers, etc. Data generated by these sensors and additional components may augment the workflow-analysis module's 30 ability to compile an accurate operator-pick-instance-profile.

To include historical data compiled prior to installation of the present system 100, the historical log of errors and their relation to particular users and particular picks and/or assignments must be imported into the system 100. This may be performed by manual data entry by a user (e.g., warehouse supervisor). Alternatively, appropriate software may be used to migrate legacy data into the new system 100.

The workflow-analysis module 30 may also generate performance data that includes site summary information. Site summary information provides an overview of a business' site operations, including, for example, site statistics which may be represented graphically (e.g., in a pie chart). The site summary may break down the activity of users of voice-directed mobile terminals 10. For example, site summary information may describe the percentage of time spent picking and travelling versus signing on or taking breaks. This site summary information provides a useful overview of a business' operations, and also provides indicators where improvement may be achieved (e.g., by reducing wasted time, improving training, buttressing hardware or software performance, etc.).

The workflow-analysis module 30 may also generate performance data that includes value-of-voice information relating to benefits realized by the utilization of a voice-enabled system. In this way, the present system 100 may provide an organization with statistical evidence of the benefits of a voice-enabled system over a traditional management system based upon orders transmitted to workers via paper or text-based mobile displays.

The workflow-analysis module 30 may also generate performance data relating to a mapping between identified instances of quality issues (e.g., mispicks) and various indicators of operator behavior. Such mapping may be useful in targeted auditing of assignments or other methods of error prevention.

The workflow-analysis module 30 may also generate performance data relating to the performance of the hardware associated with the system. For example, the performance data may include information regarding the operation of the voice-directed mobile terminal 10 or related information (e.g., need for software upgrade).

It will be appreciated that the present disclosure additionally embraces methods associated with the embodiments of the system according to the present disclosure.

To supplement the present disclosure, this application incorporates entirely by reference the following patents, patent application publications, and patent applications:
U.S. Pat. Nos. 6,832,725; 7,128,266;
7,159,783; 7,413,127;
7,726,575; 8,294,969;
8,317,105; 8,322,622;
8,366,005; 8,371,507;
8,376,233; 8,381,979;
8,390,909; 8,408,464;
8,408,468; 8,408,469;

8,424,768; 8,448,863;
8,457,013; 8,459,557;
8,469,272; 8,474,712;
8,479,992; 8,490,877;
8,517,271; 8,523,076;
8,528,818; 8,544,737;
8,548,242; 8,548,420;
8,550,335; 8,550,354;
8,550,357; 8,556,174;
8,556,176; 8,556,177;
8,559,767; 8,599,957;
8,561,895; 8,561,903;
8,561,905; 8,565,107;
8,571,307; 8,579,200;
8,583,924; 8,584,945;
8,587,595; 8,587,697;
8,588,869; 8,590,789;
8,596,539; 8,596,542;
8,596,543; 8,599,271;
8,599,957; 8,600,158;
8,600,167; 8,602,309;
8,608,053; 8,608,071;
8,611,309; 8,615,487;
8,616,454; 8,621,123;
8,622,303; 8,628,013;
8,628,015; 8,628,016;
8,629,926; 8,630,491;
8,635,309; 8,636,200;
8,636,212; 8,636,215;
8,636,224; 8,638,806;
8,640,958; 8,640,960;
8,643,717; 8,646,692;
8,646,694; 8,657,200;
8,659,397; 8,668,149;
8,678,285; 8,678,286;
8,682,077; 8,687,282;
8,692,927; 8,695,880;
8,698,949; 8,717,494;
8,717,494; 8,720,783;
8,723,804; 8,723,904;
8,727,223; D702,237;
8,740,082; 8,740,085;
8,746,563; 8,750,445;
8,752,766; 8,756,059;
8,757,495; 8,760,563;
8,763,909; 8,777,108;
8,777,109; 8,779,898;
8,781,520; 8,783,573;
8,789,757; 8,789,758;
8,789,759; 8,794,520;
8,794,522; 8,794,525;
8,794,526; 8,798,367;
8,807,431; 8,807,432;
8,820,630; 8,822,848;
8,824,692; 8,824,696;
8,842,849; 8,844,822;
8,844,823; 8,849,019;
8,851,383; 8,854,633;
8,866,963; 8,868,421;
8,868,519; 8,868,802;
8,868,803; 8,870,074;
8,879,639; 8,880,426;
8,881,983; 8,881,987;
8,903,172; 8,908,995;
8,910,870; 8,910,875;
8,914,290; 8,914,788;
8,915,439; 8,915,444;
8,916,789; 8,918,250;
8,918,564; 8,925,818;
8,939,374; 8,942,480;
8,944,313; 8,944,327;
8,944,332; 8,950,678;
8,967,468; 8,971,346;
8,976,030; 8,976,368;
8,978,981; 8,978,983;
8,978,984; 8,985,456;
8,985,457; 8,985,459;
8,985,461; 8,988,578;
8,988,590; 8,991,704;
8,996,194; 8,996,384;
9,002,641; 9,007,368;
9,010,641; 9,015,513;
9,016,576; 9,022,288;
9,030,964; 9,033,240;
9,033,242; 9,036,054;
9,037,344; 9,038,911;
9,038,915; 9,047,098;
9,047,359; 9,047,420;
9,047,525; 9,047,531;
9,053,055; 9,053,378;
9,053,380; 9,058,526;
9,064,165; 9,064,167;
9,064,168; 9,064,254;
9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;

U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;

U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDSFREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);
U.S. patent application Ser. No. 14/710,666 for PRE-PAID USAGE SYSTEM FOR ENCODED INFORMATION READING TERMINALS filed May 13, 2015 (Smith);
U.S. patent application Ser. No. 29/526,918 for CHARGING BASE filed May 14, 2015 (Fitch et al.);
U.S. patent application Ser. No. 14/715,672 for AUGMENTED REALITY ENABLED HAZARD DISPLAY filed May 19, 2015 (Venkatesha et al.);
U.S. patent application Ser. No. 14/715,916 for EVALUATING IMAGE VALUES filed May 19, 2015 (Ackley);
U.S. patent application Ser. No. 14/722,608 for INTERACTIVE USER INTERFACE FOR CAPTURING A DOCUMENT IN AN IMAGE SIGNAL filed May 27, 2015 (Showering et al.);
U.S. patent application Ser. No. 29/528,165 for IN-COUNTER BARCODE SCANNER filed May 27, 2015 (Oberpriller et al.);
U.S. patent application Ser. No. 14/724,134 for ELECTRONIC DEVICE WITH WIRELESS PATH SELECTION CAPABILITY filed May 28, 2015 (Wang et al.);
U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);
U.S. patent application Ser. No. 14/724,908 for IMAGING APPARATUS HAVING IMAGING ASSEMBLY filed May 29, 2015 (Barber et al.);
U.S. patent application Ser. No. 14/725,352 for APPARATUS AND METHODS FOR MONITORING ONE OR MORE PORTABLE DATA TERMINALS (Caballero et al.);
U.S. patent application Ser. No. 29/528,590 for ELECTRONIC DEVICE filed May 29, 2015 (Fitch et al.);
U.S. patent application Ser. No. 29/528,890 for MOBILE COMPUTER HOUSING filed Jun. 2, 2015 (Fitch et al.);
U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);
U.S. patent application Ser. No. 14/732,870 for DATA COLLECTION MODULE AND SYSTEM filed Jun. 8, 2015 (Powilleit);
U.S. patent application Ser. No. 29/529,441 for INDICIA READING DEVICE filed Jun. 8, 2015 (Zhou et al.);
U.S. patent application Ser. No. 14/735,717 for INDICIA-READING SYSTEMS HAVING AN INTERFACE WITH A USER'S NERVOUS SYSTEM filed Jun. 10, 2015 (Todeschini);
U.S. patent application Ser. No. 14/738,038 for METHOD OF AND SYSTEM FOR DETECTING OBJECT WEIGHING INTERFERENCES filed Jun. 12, 2015 (Amundsen et al.);
U.S. patent application Ser. No. 14/740,320 for TACTILE SWITCH FOR A MOBILE ELECTRONIC DEVICE filed Jun. 16, 2015 (Bandringa);
U.S. patent application Ser. No. 14/740,373 for CALIBRATING A VOLUME DIMENSIONER filed Jun. 16, 2015 (Ackley et al.);
U.S. patent application Ser. No. 14/742,818 for INDICIA READING SYSTEM EMPLOYING DIGITAL GAIN CONTROL filed Jun. 18, 2015 (Xian et al.);
U.S. patent application Ser. No. 14/743,257 for WIRELESS MESH POINT PORTABLE DATA TERMINAL filed Jun. 18, 2015 (Wang et al.);
U.S. patent application Ser. No. 29/530,600 for CYCLONE filed Jun. 18, 2015 (Vargo et al);
U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);
U.S. patent application Ser. No. 14/744,836 for CLOUD-BASED SYSTEM FOR READING OF DECODABLE INDICIA filed Jun. 19, 2015 (Todeschini et al.);
U.S. patent application Ser. No. 14/745,006 for SELECTIVE OUTPUT OF DECODED MESSAGE DATA filed Jun. 19, 2015 (Todeschini et al.);
U.S. patent application Ser. No. 14/747,197 for OPTICAL PATTERN PROJECTOR filed Jun. 23, 2015 (Thuries et al.);
U.S. patent application Ser. No. 14/747,490 for DUAL-PROJECTOR THREE-DIMENSIONAL SCANNER filed Jun. 23, 2015 (Jovanovski et al.); and
U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed is:

1. A system for managing storage, retrieval, and transport of an item in a warehouse, comprising:
 a voice-directed mobile terminal for facilitating a workflow dialog between a user and the voice-directed mobile terminal, the voice-directed mobile terminal comprising a headset, the headset comprising a microphone, the workflow dialog comprising an audio output provided to the user by at least the headset, the audio output comprising a quantity of item prompted to be picked from a location, the workflow dialog further comprising speech input at the microphone of the headset, the speech input comprising a quantity of item picked from the location and spoken by a user; and
 a server computer in communication with the voice-directed mobile terminal, configured to:
  analyze the workflow dialog and isolate a relevant portion in the workflow dialog to determine the quantity of item prompted and the quantity of item picked; and
  generate performance data based at least in part upon the analysis of the workflow dialog, wherein the performance data comprises shorting information;
 wherein the voice-directed mobile terminal is configured to:
  capture, by way of the microphone of the headset, speech input spoken by the user and comprising the quantity of item picked; and wherein the server computer of the system is configured to:
  compare the quantity of item picked to the quantity of item prompted in the workflow dialog to determine a shortage of the item at the given location;
  in response to determining that the item prompted is short, determine a travel time loss due to the shortage of item by evaluating a combination of a time taken by the user to revisit the given location to fulfill the shortage of item and an additional time taken to fulfill the shortage of the item based on one or more cascading shorts caused in an instance in which the user revisits the given location and the item prompted is short; and based on the determined travel time loss and the shorting information, generate a report providing a summary pertaining to the shorting information and the travel time loss.

2. The system according to claim 1, wherein the travel time loss due to shortage of the item is based on a combination of the time taken by the user to revisit the given location to fulfill the shortage of item and a determined time lost due to unnecessary travel to the given location, and wherein the time lost due to unnecessary travel is calculated based on evaluating a prestored summary statistics of travel segments.

3. The system according to claim 1, wherein the performance data comprises the shorting information; and wherein the server of the system is configured to:

provide, in response to determining the shortage of item at the location, an audio instruction to the user via the headset to confirm the shortage of the item at the location.

4. The system according to claim 3, wherein the shorting information comprises a shorting rate.

5. The system according to claim 1, wherein the travel time loss due to the shortage of item is calculated based at least in part upon travel distances derived from a digitized map of the warehouse.

6. The system according to claim 1, wherein the travel time loss due to the shortage of item is calculated based at least in part upon historical travel times.

7. The system according to claim 1, wherein the travel time loss due to the shortage of item is calculated based at least in part upon a rational construction of location identifiers, the rational construction of location identifiers comprises a distance measure that represents a relative distance between pick-face locations.

8. The system according to claim 1, wherein the travel time loss due to the shortage of item comprises time spent performing follow-up activities.

9. The system according to claim 1, wherein the performance data comprises wrong location information.

10. The system according to claim 1, wherein the performance data comprises unproductive time information.

11. The system according to claim 1, wherein the performance data comprises the item's order frequency.

12. The system according to claim 1, wherein the performance data comprises overtime information.

13. The system according to claim 1, wherein the performance data comprises recognition information.

14. The system according to claim 1, wherein the performance data comprises communications network information.

15. The system according to claim 1, wherein the performance data comprises an operator-pick-instance-profile.

16. The system according to claim 2, wherein the travel time loss due to shortage of the item is further based on an additional time taken to fulfill the shortage of item based on congestion caused in an instance in which a plurality of users are in the same vicinity due to the shortage of item.

17. A system for managing storage, retrieval, and transport of an item in a warehouse, comprising:

a voice-directed mobile terminal for facilitating a workflow dialog between a user and a voice-directed mobile terminal; and a server computer in communication with the voice-directed mobile terminal, configured to:

analyze the workflow dialog and isolate a relevant portion in the workflow dialog to determine a quantity of item prompted to be picked by the user from a location and a quantity of item picked by the user from the location; and generate performance data based at least in part upon the analysis of the workflow dialog, wherein the performance data comprises shorting information; wherein the voice-directed mobile terminal is configured to:

capture, by way of the microphone of the headset, speech input spoken by the user and comprising the quantity of item picked; and wherein the server is configured to:

compare the quantity of item picked to the quantity of item prompted in the workflow dialog to determine a shortage of the item at the given location;

in response to determining that the item prompted is short, determine a travel time loss due to the shortage of item by evaluating a combination of a time taken by the user to revisit the given location to fulfill the shortage of item and an additional time taken to fulfill the shortage of the item based on one or more cascading shorts caused in an instance in which the user revisits the given location and the item prompted is short; and based on the determined travel time loss and the shorting information, generate a report providing a summary pertaining to the shorting information and the travel time loss.

18. A method for managing storage, retrieval, and transport of an item in a warehouse, comprising:

transmitting task data from a server computer to a voice-directed mobile terminal in communication with the server;

providing speech-based instructions associated with the task data to a user using the voice-directed mobile terminal, the voice-directed mobile terminal for facilitating a workflow dialog between the user and the voice-directed mobile terminal, the voice-directed mobile terminal comprising a headset, the headset comprising a microphone, comprising an audio output provided to the user by the headset, the audio output comprising a quantity of item prompted to be picked from a location, the workflow dialog further comprising speech input captured at the microphone of the headset, the speech input comprising a quantity of item picked from the location and spoken by the user; and analyzing the workflow dialog between the user and the voice-directed mobile terminal, at the server, to generate performance data comprising shorting information, wherein analyzing the workflow dialog comprises:

comparing the quantity of item picked to the quantity of item prompted in the workflow dialog to determine a shortage of the item at the given location;

confirming the shortage of the item based on the comparison between the quantity of item picked and to the quantity of item prompted in the workflow dialog;

in response to confirming that the item prompted is short, determining a travel time loss due to the shortage of item by evaluating a combination of time taken by the user to revisit the given location to fulfill the shortage of item and an additional time taken to fulfill the shortage of the item based on one or more cascading shorts caused in an instance in which the user revisits the given location and the item prompted is short.

19. The method of claim 18, wherein the performance data further comprises unproductive time information, an item's order frequency, overtime information, recognition information, communications network information, and/or user confusion information.

20. The method of claim 18, wherein the travel time loss due to shortage of item is further determined based on evaluating a prestored summary statistics of travel segments.

* * * * *